UNITED STATES PATENT OFFICE.

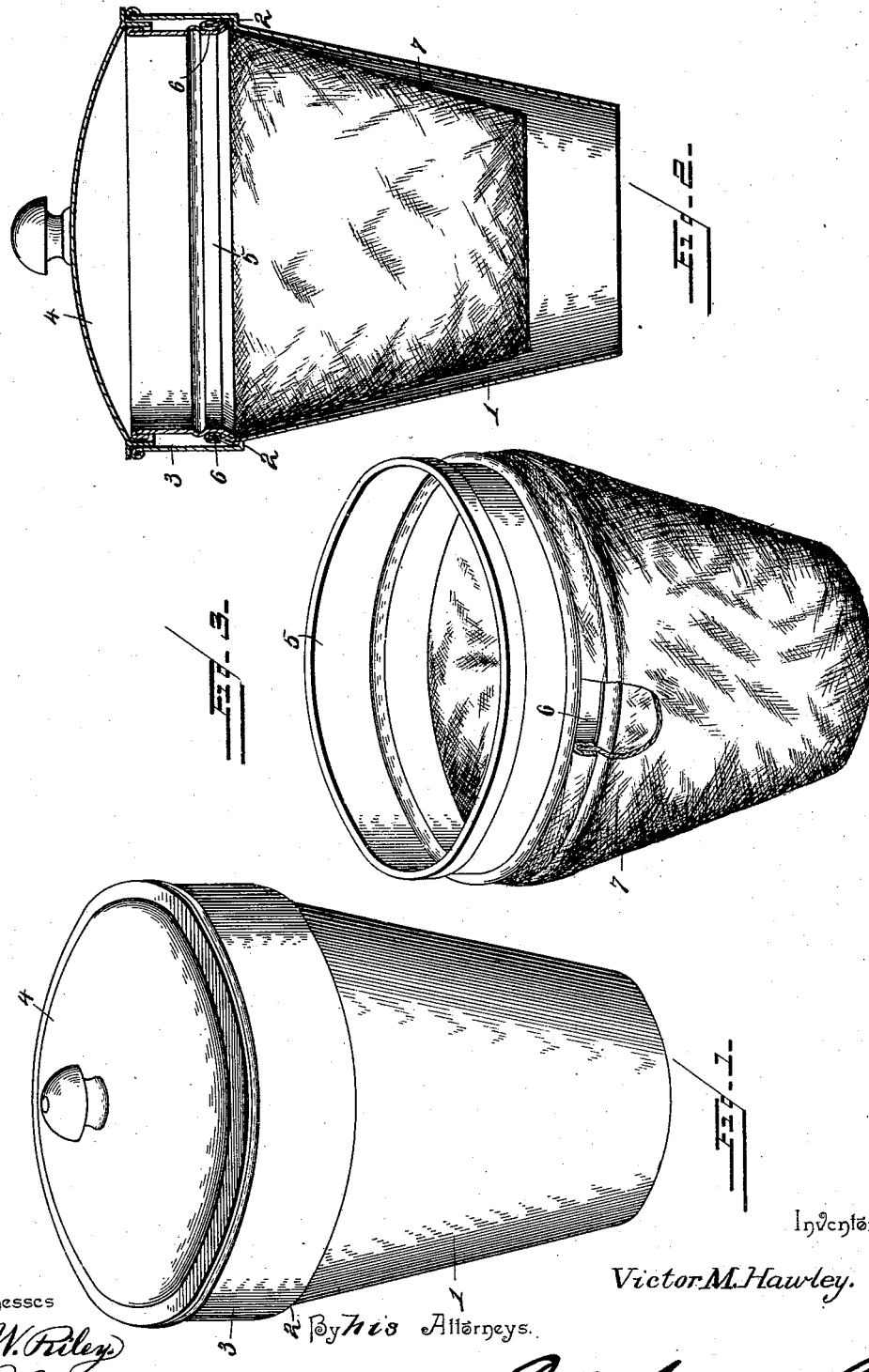

VICTOR MARSHALL HAWLEY, OF ROCHESTER, NEW YORK.

COFFEE OR TEA PERCOLATOR.

SPECIFICATION forming part of Letters Patent No. 567,387, dated September 8, 1896.

Application filed April 2, 1895. Serial No. 544,172. (No model.)

*To all whom it may concern:*

Be it known that I, VICTOR MARSHALL HAWLEY, a citizen of the United States, residing at Rochester, in the county of Monroe and State of New York, have invented a new and useful Coffee or Tea Percolator, of which the following is a specification.

This invention aims to provide a device to be used in connection with steeping or drawing tea, coffee, and similar beverages, and which can be readily applied to coffee-pots, pitchers, cups, and vessels of varying sizes and operate successfully with each the same as if specially devised for a vessel of given size.

A further object of the invention is the provision of a bag or strainer for supporting the tea or coffee so as to present a small surface at the bottom, whereby the volume of water or liquid is concentrated to a central point and must of necessity pass through a greater bulk of the coffee or tea and extract a greater amount of the essential qualities therefrom.

A still further purpose of the invention is the provision of a structure whereby the strainer or bag can be readily placed in position and quickly detached for cleaning or other purposes, and which, when in operative relation, will be firmly and securely held in place without extra fastening means or the necessity of providing retaining-prongs or other means which will require a puncturing or cutting of the said strainer-bag to secure it to supporting projections.

With these ends in view the invention consists, essentially, of a conical-shaped utensil having an inner supporting ledge or shoulder near its upper end, above which projects a rim or flange to receive a cover, a ring having an annular groove in its outer side contiguous to the lower edge and adapted to rest upon the said ledge or shoulder, and a conical-shaped strainer constructed of cloth and adapted to have its upper end sprung into the groove of the said ring, and adapted to be confined between the lower edge of the said ring and the ledge or shoulder, all as will appear more fully hereinafter.

Referring to the drawings, Figure 1 is a perspective view of the invention. Fig. 2 is a vertical central section of the device. Fig. 3 is a perspective view of the ring having the strainer attached thereto, a portion of the latter being broken away to show more clearly the annular groove provided in the outer side of the said ring.

The improved percolator comprises a utensil 1, which is conical-shaped to adapt it to vessels of different sizes, and which is provided near its upper end with a horizontal annular shoulder or ledge 2, above which projects a vertical rim or flange 3, upon which is fitted a cover 4, of any desired pattern. This utensil is formed from sheet metal, preferably tin, the parts 1, 2, and 3 being integrally constructed in any desired manner common in the art of sheet-metal working. The ring 5 is of a size approximating the diameter of the rim or flange 3, so as to fit within the latter and rest upon the shoulder or ledge 2.

An annular groove 6 is formed in the outer side of the ring a short distance from the lower edge thereof, and is adapted to receive the upper end of the strainer 7, which is sprung or otherwise secured in the said groove 6. This ring 5 is preferably formed from sheet metal, and has its edge portion folded or wired to obviate sharp edges and strengthen and brace the same, the annular groove 6 being formed in the ring by spinning, stamping, or in any other manner common in the art of manufacturing sheet-metal ware, and the lower beaded edge, which extends outward beyond the vertical body portion of the ring, forms an annular rib and is adapted to rest upon the horizontal ledge 2.

The strainer 7 is an approximately conical-shaped bag formed from textile fabric, such as usually employed in the manufacture of cloth strainers for culinary purposes. The upper edge of this strainer is tape-bound, or reinforced in any desired manner, and is of such relative size as to enable it to be sprung over the ring 5 and become seated in the groove 6 thereof. This strainer should be slightly smaller than the utensil 1, within which it is supported, so as to leave a surrounding space between it and the surrounding sides of the said utensil, thereby providing for the free passage of the fluid extract into the vessel upon which the percolator may be placed. By having the lower portion of the strainer contracted, the coffee, tea, or other substance from which it is required to extract the essential flavors and qualities is confined in a small space, and the water or other fluid is contracted to a central point and passes through a greater bulk of the said substance, consequently extracting more strength from the said substance than would be possible if the sides of the strainer were parallel.

In assembling the parts, the strainer is fitted to the ring and the latter is placed within the utensil and is supported therein upon the ledge or shoulder 2, the upper portion of the strainer being deflected and confined between the said shoulder or ledge and the lower edge of the ring, thereby providing a sure and positive means for sustaining the strainer against the weight of the substance placed therein and the water or fluid poured thereon to extract the strength and flavor from the said substance.

It will be seen that the strainer can be readily detached from the percolator for cleaning or other desired purposes, and can be quickly placed in position for use when desired. The depending rim 8 of the cover 4 enters the annular space formed between the ring 5 and the rim 3, so as to centralize the said ring 5 and insure its obtaining a uniform bearing upon the ledge or shoulder 2, and the upper edges of the rim and the ring are arranged in the same horizontal plane in order that the cover will contact with both of them to provide a double joint. This is clearly indicated in Fig. 2.

The percolator may be used in connection with a coffee or tea pot of any pattern and size within certain limits, and may be fitted to a pitcher, cup, or other vessel, and by reason of its tapering form will adapt itself to the various vessels and different sizes thereof, as will be readily understood.

While metal is preferred in the construction of the percolator, it is obvious that any material suitable for the purpose may be used in the formation of the same; also, changes in the form, proportion, and the minor details of construction may be resorted to without departing from the principle or sacrificing any of the advantages of this invention.

Having thus described the invention, what is claimed as new is—

A percolator comprising a body composed of a lower portion, a vertical rim and a horizontal shoulder or ledge connecting the rim and the lower portion, a detachable ring arranged vertically within the rim, forming an annular intervening space and provided at its lower edge with an outwardly-extending rib resting upon the horizontal ledge or shoulder of the body, the upper edge of the ring being arranged in the same horizontal plane as the upper edge of the rim, a strainer-bag having its mouth arranged on the said rib and secured between the same and the ledge or shoulder of the body, and a cover having a depending flange fitting in the annular space between the ring and the rim, said cover contacting with both the ring and the rim to provide a double joint at the top, substantially as and for the purpose described.

In testimony that I claim the foregoing as my own I have hereto affixed my signature in the presence of two witnesses.

VICTOR MARSHALL HAWLEY.

Witnesses:
JAMES COCHRANE,
C. H. JAMESON.